INVENTOR.
GERALD C. HUTH
BY RUSSELL A. McKINNEY

Roland A. Anderson

United States Patent Office 3,449,177
Patented June 10, 1969

3,449,177
RADIATION DETECTOR
Gerald C. Huth, Rosemont, and Russell A. McKinney, Philadelphia, Pa., assignors to the United States of America as represented by the United States Atomic Energy Commission
Continuation-in-part of application Ser. No. 257,935, Feb. 12, 1963, now Patent No. 3,293,435. This application June 30, 1966, Ser. No. 562,954
Int. Cl. H01l 7/34, 15/00; H01g 9/00
U.S. Cl. 148—187                                           4 Claims

ABSTRACT OF THE DISCLOSURE

Method for making a semiconductor, low energy, X-ray detector, having first and second semiconductor conductivity types that are reverse biased on opposite sides of said detector to produce a depletion region therebetween in which said X-rays are absorbed to produce hole electron pairs that are swept out of the depletion layer for collection in said respective first and second semiconductor conductivity types, comprising the steps of making said first semiconductor conductivity type with a deeply diffused portion the outer portion of which getters lifetime affecting impurities from the deeper part, and removing the outer portion by lapping and etching as measured by micrometers to produce a shallow, dopant, concentration gradient of from $10^{12}$ atoms/cm.$^3$ to 0 atoms/cm.$^3$ and a thin "window" for the passage of said X-rays therethrough to said depletion region with provision for the connection of contacts to the first and second conductivity types on the opposite sides of said detector for the removal and detection of the charges collected therein from said depletion region.

---

This invention relates to radiation detectors and more particularly to novel method and apparatus for the detection of ultra-soft X-rays in magnetic fields for spectroscopic applications. The invention described herein was made in the course of, or under a contract with the U.S. Atomic Energy Commission.

In the field of physics a need exists for an instrument capable of spectroscopically detecting and measuring the energy of very soft X-rays around accelerators where high magnetic fields are present. These X-rays have wavelengths of 44 Angstroms and are of interest especially at energies of 0.3 kev. or less. Photomultiplier detectors for X-rays do not operate properly in high magnetic fields or at such low energies. Others, such as photographic emulsion detectors require difficult and time consuming evaluation techniques or do not provide sufficient resolution for spectroscopic applications. It is also desirable to provide stable, efficient and routine detection over long periods of time.

In accordance with this invention there is provided a method and apparatus for detection of soft X-rays produced by accelerating devices operating in the multiple bev. range, such as the Alternating Gradient Synchrotron at the Brookhaven National Laboratory. The method and construction involved in this invention utilizes standard and well-known techniques and apparatus and is highly flexible for a wide rage of application, energies, types of particles, and magnetic fields. More particularly this invention involves the use of a thin window diffused junction, semiconductor, radiation detector in which the junction is diffused to an extreme depth and then lapped and etched to obtain the desired thin window. With the proper selection of materials and procedures, as described in more detail hereinafter, the desired semiconductor detector and detection is achieved.

It is thus an object of this invention to provide an economical and practical detector for routinely determining and measuring the energy of soft X-rays;

It is another object to provide a very thin window, diffused junction semiconductor radiation detector;

It is another object to detect and measure soft X-rays in and around high magnetic fields, such as near high energy accelerators;

It is another object to provide a large, uniform, stable, long lifetime particle detection area in diffused p-n junction semi-conductor radiation detectors;

Another object is provision for an efficient, dependable and trouble-free method for producing thin window, diffused junction semiconductor radiation detectors.

The above and further novel features and objects of this invention will appear more fully from the following detailed description when the same is read in connection with the accompanying drawings. It is to be expressly understood, however, that the drawings are not intended as a definition of the invention but are for purposes of illustration only.

In the drawings where like elements are referenced alike:

The detector of this invention is particularly useful in spectroscopic analysis of soft X-rays produced by the bombardment of targets with high energy charged particles in accelerators, such as the Brookhaven AGS. The detector of this invention is useful, however, in any application where charged particle radiation detection and/or energy measurement are desired.

Figure 1:
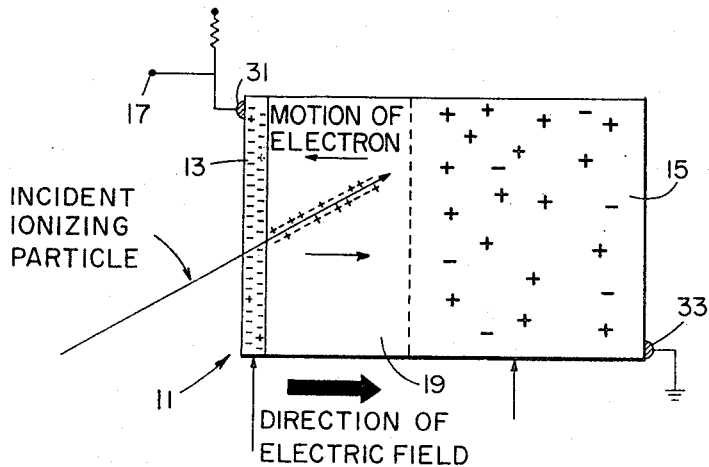
FIGURE 1 is a partial cross-section of a controlled, diffused junction semiconductor radiation detector.

In understanding this invention, reference is made to FIGURE 1, which is a partial cross-section of a diffused junction semiconductor radiation detector 11 having a p-n junction in one piece of silicon. The right-hand side contains a gas of free mobile holes and very few free electrons and the left side contains a gas of free mobile electrons and very few free holes.

The respective portions 13 and 15 comprise n doped p semiconductor crystals or p doped n semiconductors respectively and the semiconductors may be either silicon or germanium.

Advantageously the n region is made by diffusing phosphorous from a gas into a first portion of a p-type silicon crystal. Likewise the p region is made by diffusing boron or gallium from a gas into a portion of an n-type silicon crystal. In one method, for example, boron oxide is heated in a furnace at 1200° C. to diffuse the boron into a portion of an n-type crystal 11.

In the p-type silicon the pure silicon crystal is uniformly doped with p-type impurities and in the n-type silicon the pure silicon crystal is uniformly doped with n-type impurities. There are approximately $10^{22}$ atoms of silicon/cm.$^3$ of crystal 11, and when n-type silicon is used the phosphorous impurities amount to about 1 atom of phosphorous in one million-million atoms of silicon. When p-type silicon is used the boron or gallium impurities are likewise correspondingly small in number.

When an electric field is applied from source 17 the electrons move to the left and the holes to the right, leaving between them a region 19 containing almost no carriers. This region 19 is called the depletion layer in a p-n junction, the net result of which is simply a reverse-biased p-n junction. The reason why such a junction conducts very little current is that all the current carriers have been removed from the depleted region 19, exposing a slice of material that is essentially an insulator.

Within the depletion layer 19 there exist just the conditions required for a detector. If an ionizing particle is incident on the depleted region, this particle will leave a trail of hole-electron pairs within that region and these pairs will be swept out because of the presence of the electric field. The resulting quantity of charge flows into an external circuit where the amount of this charge corresponds to and indicates the energy of the incident particle.

For convenience these devices are made by forming a very thin n-type layer, characteristically 0.1 micron thick, on the surface of a p-type silicon wafer one inch in diameter and 250 mils thick. Particles impinging on the n doped face 13 pass right through the thin n layer and enter the depletion layer 19. However, they deposit a finite amount of energy in the n layer (or p layer as the case may be and this limits the detection of incident particles to a high level above that of the soft X-rays desired to be detected.

Another limiting factor may be described as the "lifetime" of the hole-electron pairs. In order to detect the incident particle accurately, all the hole-electron pairs must travel to their respective n or p layer, it being noted that the tendency of the pairs to recombine is forbidden by momentum-energy conservation in a perfect silicon lattice. However, the lattice does contain defects such that sometimes the holes and electrons do not have a long enough lifetime to traverse the necessary distance to their respective n or p layer or in these n or p layers to the contacts on their respective faces.

In explaining this lifetime concept, reference is made to a perfect crystal having the properties that not much energy is required to produce a hole-electron pair. When pairs have been produced both the holes and the electrons are free to move all the way to the conducting electrodes so that all their charge is collected. The motion of the holes and electrons at low electric fields depends on their mobility i.e. the velocity of a carrier equals a constant (called its mobility) multiplied by the electric field. Since the carriers are constantly colliding with the vibration lattice, their motion is really a drift superimposed on a random motion.

The mobilities for holes and for electrons are generally different. The time for which a carrier exists in the lattice before getting trapped i.e. stuck at a lattice defect or recombining is called its lifetime. It is in the range of nanoseconds to hundreds of microseconds and is strongly dependent in the state of the material, its purity, the dimensions of the n and p layer respectively, and the specific method used to produce these specific n and p layers.

Hole and electron lifetimes are in general different, and since the distance that a carrier can go is given by its speed multiplied by the time for which it travels, it is controlled by the mobility-lifetime product. Thus, the material required for low energy X-ray detection must have good mobility-lifetime products substantially all the way (or all the way) across the detector 11 from the face of region 13 to the face of region 15 in these faces to their respective contacts 31 and 33, thereby to sweep all the hole-election pairs to these conducting electrodes 31 and 33.

The material must also be a good insulator because, if it is not, the lattice will contain large numbers of free carriers, and consequently the additional holes and electrons produced by the incident particle will cause only an insignilcant change in the total and will not be noticed. Two semi-conductor materials, namely silicon and germanium are available in high purity with excellent crystal lattices but they do not have high enough electrical resistivities to be useable per se.

The difference between a semiconductor and an insulator lies only in the size of the band gap. Silicon has a band gap of 1.2 volts. At room temperature the lattice is in a constant state of agitation, and phonons corresponding to the lattice vibrations have energies of a few tens of millivolts. Every now and then, because of local statistical fluctuation, some phonons are produced that have energies greater than 1.2 ev. and are, therefore, able to break a covalent bond between the silicon crystal atoms and produce a free-hole electron pair. In silicon at room temperature there are $\approx 10^{10}$ pairs per cubic centimeter due to this process, which is a dynamic one with new pairs constantly being produced as the older ones recombine. This number is far too large for the material to be employed as a radiation detector. In germanium, with a band gap of only 0.78 volt, the situation is even worse.

By making the band gap in silicon crystal 11 slightly greater than 1.4 volts, the number of pairs/cc. at room temperature would drop ou drastically to only $\approx 10^5$, and the material could be used directly; however the size of the band gap has not heretofore been controllable. Cooling also could reduce the free carrier concentration but this is inconvenient. However, it is possible to reduce the conductivity of silicon to an extremely low level by providing n and p doping wherein the former contains a large number of free electrons, which are negative or donor charge carriers, and very few holes, which are positive or acceptor charge carriers and the latter contains a large number of free holes and few free electrons. The region 19 in this device is a drift region 19 the carriers being drifted by the electric field due to the impurity gradient to the collection (or multiplication) region.

Figure 2:
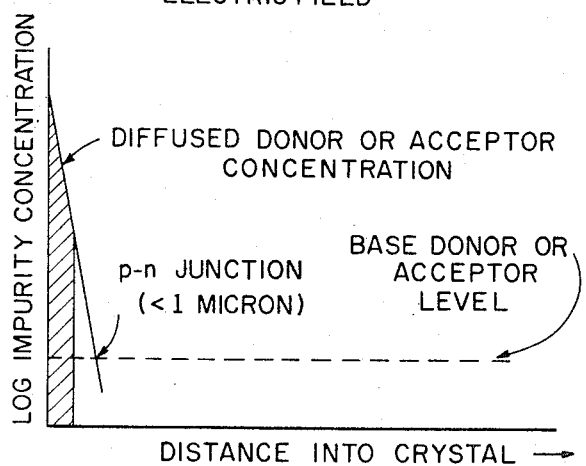
FIGURE 2 is a schematic illustration of Log Impurity Concentration vs. Distance Into Crystal of FIGURE 1 with the disturbed region discarded therefrom.

Heretofore, this n and p doping produced a window or dead layer in which the lifetime of the holes or eletrons from the hole electron pairs was short. Referring to FIG. 2, for example, it has been discovered that even the achievement of thin window diffusions by shallow diffusion does not help sufficiently. In such cases the window (or dead layer referred to above) is found to be generally 0.5 of the diffusion depth. A diffusion to only one micron, which is very difficult results in a window of 0.5 micron, which is, in radiation detection, a relatively thick window. This is indicated by the cross hatched area in FIGURE 2. The lifetime in this region is low because the high acceptor or donor concentration in this window (dead layer) area disrupts the semiconductor lattice by creating carrier recombination centers and effectively "getters" lifetime affecting atoms, such as copper, iron etc. into this region. The radiation generated carriers in this region thus recombine before being usefully collected.

In accordance with this invention the diffusion e.g. the n diffusion or doping, is made to an extreme depth with a gradual gradient of dopant. A first portion of this dopant gradient is dead and the remaining portion of this dopant or diffused gradient region is not dead. Accordingly, the dead region is removed so as to expose the lively or long-lifetime remaining portion of the diffused gradient region. The p diffusion is handled correspondingly. Thus this invention produces a p-n junction detector with a substantially small or removed dead region.

Figure 3:
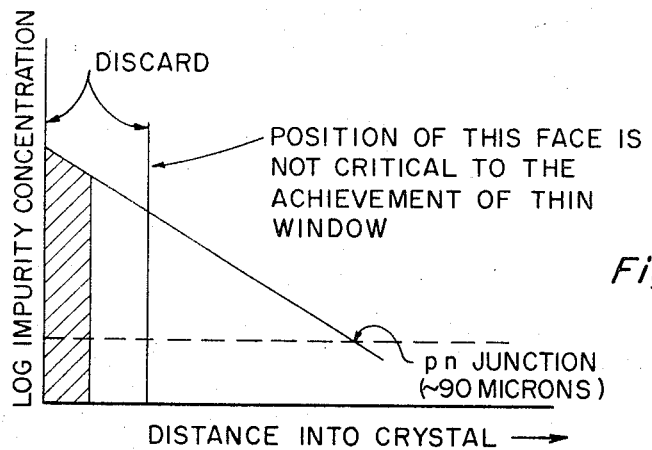
FIGURE 3 is a schematic illustration of Log Impurity Concentration vs. Distance Into Crystal of FIGURE 1 with the disturbed region discarded therefrom in accordance with this invention.

In one actual embodiment, illustrated in FIGURE 3, the junctions are diffused between 75–90 microns in a 100 micron thick crystal 11. As illustrated, the gradient is gradual because the diffusion is deep. The gradient, therefore, corresponds to the diffusion depth, the deeper the depth the shallower the gradient becoming. The first 25–50 microns are removed. This produces a window of less than 0.5 micron equivalent thickness. Moreover, the amount of semiconductor discarded, which is from 25 to 50 microns, does not increase the window thickness.

In actual tests, the windows of this invention are so thin that measurement of them becomes very difficult. In the measurements that have been made, the window has been so thin that 0.3 kev. ultra soft X-rays of 44 Angstroms wavelentgh have easily and repeatedly been detected and measured. These photons are absorbed in approximately 0.3 micron of silicon.

This method for producing a gradual concentration gradient of n-type (phosphorous) dopant in a p-doped (boron or gallium) doped silicon crystal, comprises the steps of diffusing n-type (phosphorous) dopant into said crystal to form a gradient 75 microns deep in standard silicon having $10^{22}$ atoms of silicon/cm.$^3$ and one atom of boron per million-million atoms of silicon whereby said n-type dopant gradient in said crystal goes from at least $10^{22}$ atoms of n dopant/cm.$^3$ (i.e. a coating of n dopant) to 0 atoms/cm.$^3$, and removing a depth of 50 microns of said n-type dopant thereby to provide a gradient from $10^{12}$ to 0 atoms/cm.$^3$ of said n-type dopant in said p-type doped crystal (i.e. a 25 micron depth of said n-type dopant in said p-type crystal).

This method for producing a gradual concentration gradient of p-type (boron) dopant in an n-doped (phosphorous) doped silicon crystal, comprises the steps of diffusing p-type dopant (advantageously boron) into said crystal to form a gradient 75 microns deep in standard silicon having $10^{22}$ atoms of silicon and one atom of phosphorous per one million-million atoms of silicon whereby said p-type dopant gradient in said crystal is at least from $10^{22}$ atoms (i.e. a coating of p dopant material) to 0 atoms/cm.$^3$, and removing a depth of 50 microns of said p-type dopant to provide a gradient from $10^{12}$ to 0 atoms/cm.$^3$ of said p-type dopant in said n-type doped crystal (i.e. a p-type dopant gradient 25 microns deep).

It will be understood from the above that the detector 11 of this invention has a low concentration of diffused specie in the surface region and "gettering" still goes on in the deep junction and is essential. We, however, throw away the high impurity concentration region where all the unwanted specie have been gettered to.

The gettering is accomplished in the diffusion by at least two mechanisms. For different species that form glasses on the silicon surface (i.e. boron, phosphorous) (or arsenic) the primary gettering mechanism is thought to be the enhanced solubility of the fast diffusing metals in the liquid at the normal >1000° C. diffusion temperature glassy surface layer. In this regard, the glassy phases melt in the vicinity of 1000° C. and this melting point is a function of the boron or phosphorous (or arsenic) content of the glass so as to mitigate against a low temperature diffusion. With gallium, the gettering action is thought to be obtained by the electronic interaction between the fast diffusing impurity metals and the shallow gallium acceptor. The result is that the solubility of the unwanted impurities are consequently concentrated in such regions. Thus the solubility of copper in a surface concentration of $10^{20}$ cm.$^{-3}$ is two to three orders of magnitude higher than in the bulk of the structure of this invention having a donor density of $\approx 10^{14}$ cm.$^{-3}$ or less.

It is additionally believed that the very deep initial diffusion of this invention is necessary to obtain sufficient junction front uniformity. This is particularly important for high junction fields to provide carrier multiplication.

The portion removed from the deeply diffused crystal 11, is removed by lapping and etching. This process comprises lapping 20–30 microns and etching 1–0.5 micron. This produces a flat, polished, detector surface whereas if there is larger removal by etching, the detector surface is not flat and performance is degraded. The dimensions of the lapping are determined by micrometers and the etching dimension is determined by micrometers and/or time. A maximum of one minute in etch comprising nitric and hydrofluoric acid will remove ½ micron. One suitable etch is CP4D etch.

In order to eliminate variable junction series resistance, which affects RC time constant and thus speed of response and contact sensitivity produced by thin windows, the contacts are advantageously thermal compression bond (TCB) contacts. This bond is formed at low temperature and pressure with gold silicon alloy which is liquid at 370° C. Thus the junction crystal 11 need not be raised to the temperature where the movement of fast diffusing impurities affect junction characteristics. To this end the junction is kept below 500° C. and pure gold wire is used for the face contacts with no apparent effect on series resistance. This is so because of the weak donor activity of gold and its low solubility in silicon.

In another embodiment the gold contact contains 1–2% of antimony so as to lower R to values equal to or less than 30 ohms.

Figure 4:
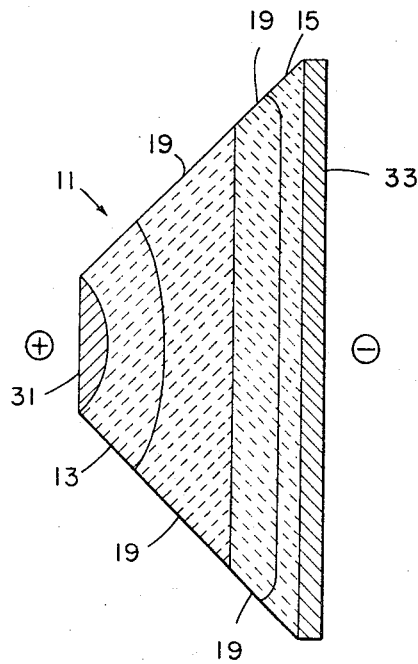
FIGURE 4 is a partial cross-section of a beveled (contoured) junction detector.

In another embodiment this invention is embodied in a contoured detector 11. This embodiment is shown in FIG. 4. This detector comprises a silicon p+n arrangement 13 and 15 as described, having a frustum conical shape and a beveled junction with a shallow angle $\theta$, typically 2° to 5° between the top small plateau area and the bottom parallel base. When the reverse bias is applied to the junction, the space charge region spreads through the base and because the electric field in a semiconductor must be normal to the surface thereof (in the absence of surface charges) the space charge region must distort. The geometry of the junction, therefore, and the distortion effectively result in a very large surface space charge region into which the very low energy radiation can be introduced directly to produce output pulses corresponding in amplitude to the incident particle energy. In this embodiment, a small n-doped region is made in the top small plateau area of a p-silicon wafer having a frustum conical shape by an oxide masking technique in which an oxide layer is grown on the surface of the p-type wafer 11, a hole is etched through the oxide layer or quartz and the n doping phosphor is diffused deeply (at least 75 microns deep) into the p-type silicon surface through the hole. Thereupon the oxide layer, 20–30 microns of the n doped region are removed by lapping, 0.5 to 1 micron of the n doped region is removed by etching to leave an n-region of a depth of at least 25 mils in said p-doped silicon, and the gold contacts are applied by TCB at low pressure and temperature below 500° C., to the opposite remaining plateau areas to connect the contacts respectively to the remaining n and p regions.

In this embodiment, the basic contoured detector is described in U.S. patent application Ser. No. 257,935, filed in Feb. 12, 1963 (now U.S. Patent 3,293,435) entitled "Semiconductor Charged Particle Detector by Gerald C. Huth. The invention of this application represents an improvement over the contoured detector described in that copetnding application, since the contoured detector of that application has a thick window. As the inventor Huth of this application is the inventor of that co-pending application, this embodiment of this invention represents a continuation-in-part of application Ser. No. 257,935.

This invention has the advantage of providing a practical and efficient method of making a low energy, semiconductor, X-ray detector for routine use in a magnetic field. Actual tests have shown that the detector of this invention in accordance with the system of this invention routinely, stably, and accurately detects and measures the energy of X-rays having an energy of down to 0.3 kev. or less for spectrographic applications over a wide energy and particle range. By providing a deep diffusion to between 75–90 microns and removing the first 25–50 microns by lapping and etching the desired thin window, line detector and gradual diffusion gradient are achieved.

What is claimed is:

1. The method for making a diffused junction, contoured, semiconductor, low energy, X-ray detector having a junction between first and second silicon types that are reverse biased on opposite sides of said detector to form reduced thickness first and second silicon types forming therebetween an intrinsic silicon, insulator, depletion region substantially devoid of positive and negative carriers in which X-rays are absorbed to produce hole-electron pairs that are swept out of said depletion region by said reverse bias for the separate collection of said holes and electrons in reduced thickness first and second silicon types wherein impurities adversely affect the lifetime of said hole-electron pairs, comprising the steps of diffusing a dopant of one conductivity type onto and for a depth of at least 50 microns into a wafer of a first silicon codnuctivity type having opposite, flat, parallel faces to convert said diffused depth to an opposite second silicon conductivity type having a concentration gradient of said dopant from the surface of said second conductivity type of from $10^{22}$ atoms/cm.$^3$ to 0 atoms/cm.$^3$ at a junction with said first silicon conductivity type whereby the outer 25 micron portion of said diffused first silicon conductivity type tends to getter said lifetime affecting impurities from the deeper portion thereof, measuring the thickness of said wafer with micrometers, removing a depth of 25 microns of said diffused second silicon conductivity type as measured by said micrometers to remove said gettered impurities therein and to reduce said dopant concentration gradient therein to from about $10^{12}$ to 0 atoms/cm.$^3$ while maintaining flat parallel wafer faces, and applying separate gold contacts containing 1–2% antimony to said first and second silicon conductivity types on opposite sides of said junction for said reverse biasing of said wafer.

2. The invention of claim 1 in which said diffusion comprises, diffusing n type dopant into p-type silicon for two hours at 1200° C., and said removing is by lapping and etching for removing 0.5 to 1 micron by etching.

3. The method of producing a gradual concentration of p-type dopant in an n-doped silicon crystal containing small amounts of impurities, comprising diffusing p-type dopant into a portion of said crystal for a predetermined time of two hours to form a gradient at least 50 microns deep in silicon having $10^{22}$ atoms/cm.$^3$ and at least one atom of phosphorous in one million-million atoms of silicon whereby said p-type dopant gradient in said crystal is at least from $10^{22}$ atoms/cm.$^3$ to 0 atoms/cm.$^3$ for gettering said impurities in the outer portion thereof, lapping a depth of 25 microns of said p-type dopant to remove said gettered impurities and to provide a flat surface and a gradient of from $10^{12}$ to 0 atoms/cm.$^3$ of said p-type dopant in said n-type crystal as mechanically measured by a micrometer against said flat surface, and etching away a depth of said p-type dopant for a predetermined time period of 1 minute to remove only 0.5 to 1 micron of said p-type dopant while retaining said flat surface.

4. The method of producing a contoured radiation detector having first and second respective doped silicon portions having an opposite conductivity arrangement forming two parallel faces having therebetween a shallow angle beveled junction, comprising the steps of applying a thin oxide mask to the small diameter plateau face area of a first roped silicon wafer having a frustum conical shape, diffusing a second dopant of opposite conductivity type into a portion of said first doped silicon through a small hole in said oxide mask, sequentially lapping and etching away said oxide mask and a depth of at least 25 to 30 microns of said small diameter plateau face through which said second dopant is diffused so as to leave a second doped region of a depth of at least 60 mils in said first dope silicon, and adding separate gold contacts containing 1–2% antimony to said first and second doped regions on opposite sides of said junction.

References Cited

UNITED STATES PATENTS

| | | | |
|---|---|---|---|
| 2,790,940 | 4/1957 | Prince | 148—186 X |
| 2,873,222 | 2/1959 | Derick et al. | 148—187 X |
| 2,981,874 | 4/1961 | Rutz | 148—186 X |
| 3,102,061 | 8/1963 | Thornhill | 148—186 X |
| 3,108,914 | 10/1963 | Hoerni | 148—186 |
| 3,255,055 | 6/1966 | Ross | 148—186 |
| 3,261,074 | 7/1966 | Beauzée | 148—1.5 X |

L. DEWAYNE RUTLEDGE, *Primary Examiner.*

R. A. LESTER, *Assistant Examiner.*

U.S. Cl. X.R.

29—572, 578; 148—1.5, 186, 189